(12) United States Patent
Flores et al.

(10) Patent No.: US 10,326,703 B2
(45) Date of Patent: *Jun. 18, 2019

(54) DYNAMIC INITIAL CONGESTION WINDOW MODIFICATION

(71) Applicant: Verizon Digital Media Services Inc., Dulles, VA (US)

(72) Inventors: Marcel Eric Schechner Flores, Chicago, IL (US); Amir Reza Khakpour, Santa Monica, CA (US); Robert J. Peters, Santa Monica, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,489

(22) Filed: Oct. 10, 2017

(65) Prior Publication Data

US 2018/0034742 A1 Feb. 1, 2018

Related U.S. Application Data

(63) Continuation of application No. 14/561,775, filed on Dec. 5, 2014, now Pat. No. 9,794,181.

(51) Int. Cl.
*H04L 12/807* (2013.01)
*H04L 12/801* (2013.01)

(52) U.S. Cl.
CPC ............ *H04L 47/27* (2013.01); *H04L 47/193* (2013.01)

(58) Field of Classification Search
CPC .............................. H04L 47/27; H04L 47/193
USPC ......................................... 370/237, 230, 235
See application file for complete search history.

(56) References Cited

U.S. PATENT DOCUMENTS

| | | | |
|---|---|---|---|
| 2003/0193893 A1* | 10/2003 | Wen | ..................... H04L 12/5602 370/231 |
| 2005/0013245 A1 | 1/2005 | Sreemanthula et al. | |
| 2005/0254420 A1* | 11/2005 | Wager | ..................... H04L 29/06 370/230 |
| 2009/0303877 A1* | 12/2009 | Park | ..................... H04L 41/0896 370/231 |

(Continued)

*Primary Examiner* — Kwang B Yao
*Assistant Examiner* — Syed M Bokhari
(74) *Attorney, Agent, or Firm* — Ansari Katiraei LLP; Arman Katiraei; Sadiq Ansari

(57) ABSTRACT

Some embodiments increase throughput across a connection between a host and a client by initializing the congestion window for that connection dynamically using a previously settled value from a prior instance of the connection established between the same or similar endpoints. An initialization agent tracks congestion window values for previously established connections between a host and various clients. For the tracked congestion window values of each monitored connection, the initialization agent stores an address identifying the client endpoint. When establishing a new connection, the initialization agent determines if the new connection is a recurring connection. A new connection is recurring when the new connection client address is similar or related to an address identified for a previous monitored connection. For a recurring connection, the initialization agent initializes the new connection congestion window using a value derived from the tracked congestion window values of the recurring connection.

18 Claims, 6 Drawing Sheets

(56) References Cited

U.S. PATENT DOCUMENTS

| | | | |
|---|---|---|---|
| 2011/0261691 A1* | 10/2011 | Jin | H04L 47/12 370/230 |
| 2014/0198651 A9* | 7/2014 | Zhou | H04L 47/11 370/235 |
| 2014/0304425 A1* | 10/2014 | Taneja | H04L 47/12 709/235 |
| 2015/0146526 A1 | 5/2015 | Kulkarni | |
| 2015/0188830 A1* | 7/2015 | Zhao | H04L 47/27 370/235 |
| 2015/0271071 A1* | 9/2015 | Odell | H04L 47/27 370/230 |

* cited by examiner

DYNAMIC INITIAL CONGESTION WINDOW MODIFICATION

CLAIM OF BENEFIT TO RELATED APPLICATIONS

This application is a continuation of U.S. nonprovisional patent application Ser. No. 14/561,775 entitled "Dynamic Initial Congestion Window Size Modification", filed Dec. 5, 2014. The contents of application Ser. No. 14/561,775 are hereby incorporated by reference.

BACKGROUND INFORMATION

Standardized protocols, such as the Internet Protocol (IP), the Transmission Control Protocol (TCP), and the Hyper-Text Transfer Protocol (HTTP), control how most of the data and digital content is delivered across the different data networks that form the Internet. These protocols have been developed to promote interoperability. The interoperability ensures that any device can send data to and receive data from another device so long as they communicate using the standardized protocols. As such, smartphones, tablets, set-top boxes, special purpose peripherals, laptop computers, desktop computers, and other network enabled devices are able to communicate with one another. The interoperability also ensures that devices are able to communicate regardless of their network connectivity. Specifically, connection-oriented protocols, such as TCP, ensure that devices will receive their requested data regardless of whether the devices have a 1 Megabit per second (Mbps) connection, 10 Mbps, or 100 Mbps and regardless of the amount of congestion that may be present on the underlying network links used in connecting two devices.

In some cases, the desire to promote interoperability and general applicability of the protocols has come at a tradeoff of performance optimization. The result is that various inefficiencies exist within the protocols, especially when the protocols are applied in fixed, recurring, or controlled environments. When certain variables that can impact network performance are fixed or known, there is an opportunity to improve network performance by circumventing some of the protocol flow control and congestion control mechanisms that are inherent within standard networking protocols.

Accordingly, there is a need for optimized networking protocols that can take advantage of fixed or known conditions that exist in some network environments and that can leverage these conditions to bypass various slow-start mechanisms that are inherent within the protocols. Any optimizations, however, should not compromise overall interoperability such that a protocol optimized resource can continue to interoperate with a resource operating according to a standard non-optimized protocol.

BRIEF DESCRIPTION OF THE DRAWINGS

A preferred embodiment for optimizing network connection throughput with dynamic congestion window initialization will now be described, by way of example only, with reference to the accompanying drawings in which.

DETAILED DESCRIPTION OF PREFERRED EMBODIMENTS

Figure 1:
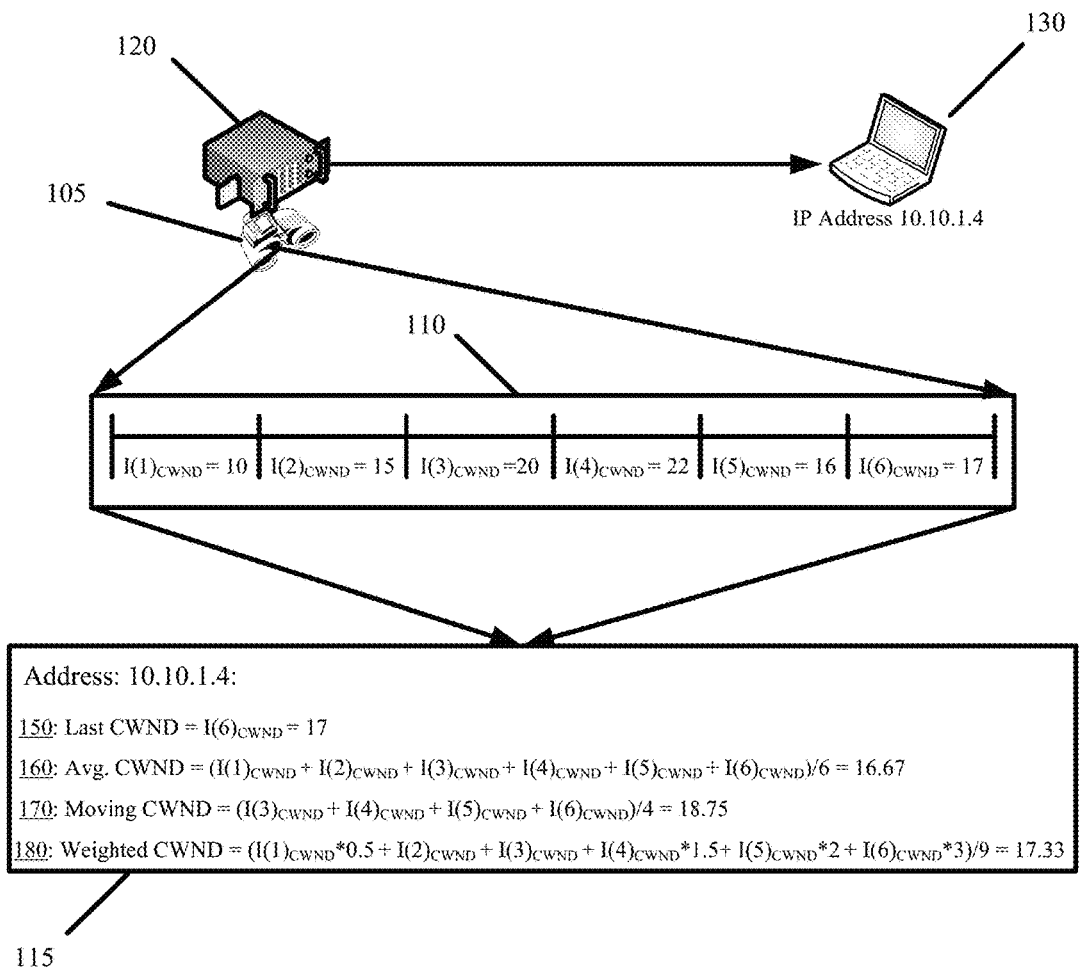
FIG. 1 conceptually illustrates congestion window monitoring and tracking as performed by the initialization agent in accordance with some embodiments.

The Transmission Control Protocol (TCP) ensures reliable transmission of data over a connection established between two endpoints. In this specification, the endpoints of a TCP connection are referred to as a host and a client, wherein a host is a server or provider of data and a client is a recipient of the data provided by the host. When the data exchange between the two endpoints is bidirectional, the endpoint providing data at any given point in time is still referred to as the host and the other endpoint receiving the data is the client.

TCP ensures the reliable transmission of data in part with various flow control and congestion control mechanisms. TCP slow-start is part of the congestion control mechanism that prevents a host from creating or adding to congestion in the underlying network. The procedure is standardized as part of the TCP protocol and defined by at least Request For Comment (RFC) 2001, 2581, and 5681 which are incorporated herein by reference.

Some embodiments leverage persistent qualities of recurring connections in order to circumvent some aspects of the TCP congestion control mechanism and improve network performance as a result. Specifically, some embodiments increase throughput across a TCP connection by initializing the congestion window for that connection dynamically using a previously settled value from a prior instance of the connection established between the same or similar endpoints. In so doing, the offered embodiments circumvent the TCP slow-start phase, whereby the connection congestion window is initialized with a smaller preconfigured default starting value and gradually increased to the settled value. By initializing the connection congestion window dynamically with the previously settled value, the connection host is able to commence transmission over the connection with a larger number of outstanding packets than when commencing transmission with the smaller preconfigured default starting congestion window value of standard TCP slow-start.

A recurring connection is a connection that is established, terminated, and subsequently reestablished between the same or similar endpoints. The congestion window for different instances of a connection recurring between the same endpoints usually settles around a common value or size, because the connection is established and reestablished over the same network hops or network links with the congestion over these hops or links being persistent or within a constant range.

Recurring connections are common for intra-network communications. Intra-network communications typically involve a host and client that are operated by or under the control of the same entity. A content delivery network (CDN), cloud service provider, enterprise, or other operators of a distributed platform deploy resources that engage in extensive intra-network communications. In a CDN, for example, a CDN caching server often establishes a connection to a CDN origin server in order to retrieve content in response to a cache miss. Recurring connections are also prevalent in various inter-network communications. For example, different networks may have peering arrangements that allow the networks to exchange data over one another's networks. To facilitate the peering arrangement data exchange, connections are continually established between the same network gateways.

Some embodiments implement an initialization agent as part of the host. The initialization agent monitors and tracks the congestion windows of various connections that are established between the host and various clients, wherein the clients can include intra-network servers, internal network servers, inter-network servers where there is some recurring relationship, other hosts, and third party users or devices that connect for some recurring need. The initialization agent leverages values obtained from tracking the congestion windows of prior connections in order to initialize the congestion window of new connections being requested from and established by the host. In this manner, the congestion window of a new window is not statically initialized with a preconfigured default starting value, but rather is dynamically initialized with a value that is derived from congestion observed on a prior instance of that connection or a similar connection.

Once the initialization agent dynamically initializes the congestion window of a new connection, standard TCP congestion procedures take over management of the connection and adjust the congestion window according to observed performance of the client and network congestion. In other words, the disclosed embodiments are directed to dynamically initializing the congestion window for a newly established connection, but defer to standard TCP congestion procedures to negotiate or adjust the congestion window after initialization. This ensures and preserves interoperability between hosts operating according to the optimized TCP protocol implemented by the initialization agent and clients that are not enhanced with the initialization agent and that operate according to the standard TCP protocol.

Figure 6:
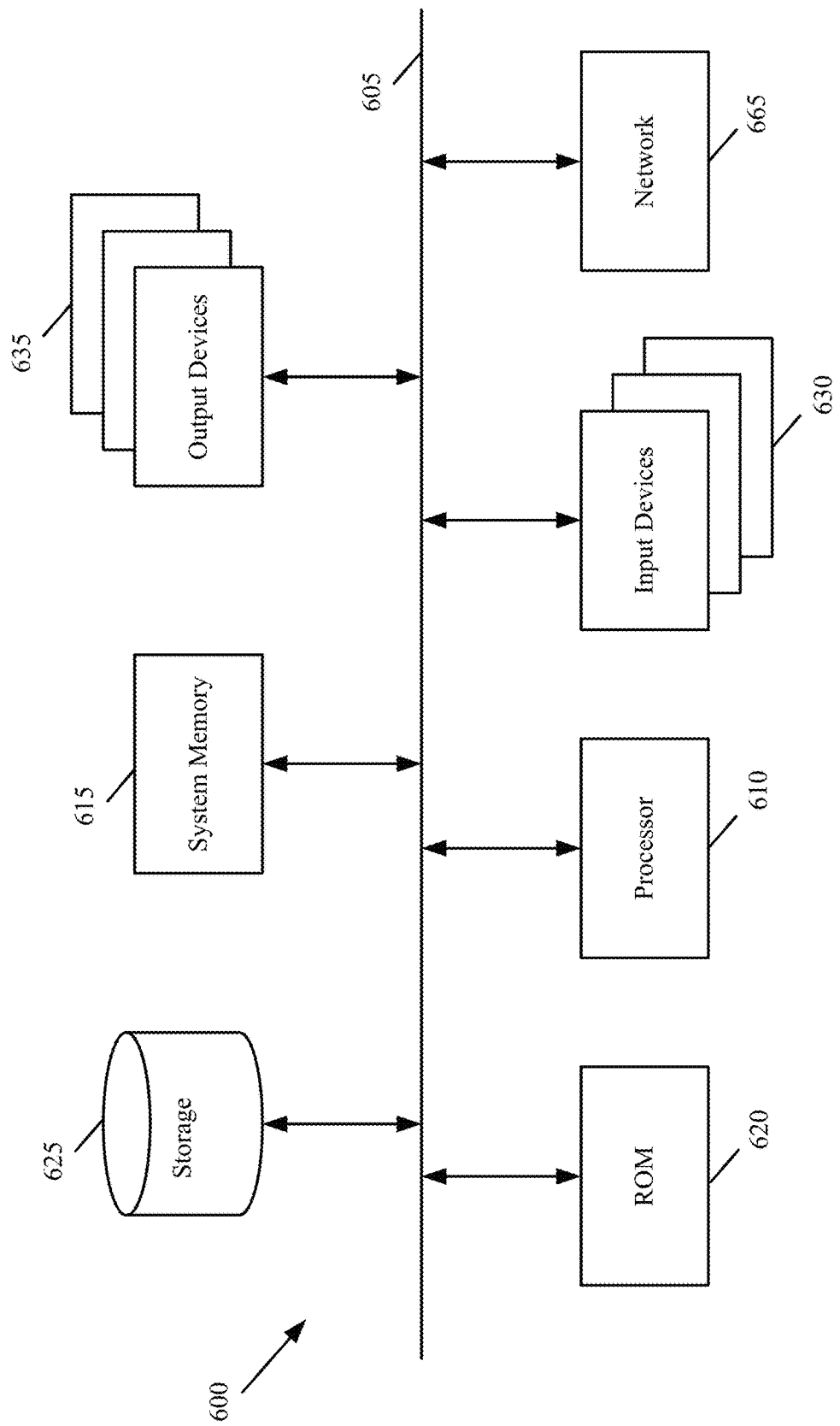
FIG. 6 illustrates a computer system or server with which some embodiments are implemented.

The initialization agent can be part of a special purposed machine that operates as a host providing the dynamic congestion window initialization in accordance with some embodiments. FIG. 6 below describes some hardware components of such a machine. The initialization agent can run directly on a host or can run remote from the host being monitored. In some embodiments, one instance of the initialization agent can monitor and track the congestion windows of established connections and provide the dynamic congestion window initialization for two or more hosts.

In some embodiments, the initialization agent is configured with real-time access to a host's TCP protocol stack in order to perform the congestion window monitoring and tracking. In some such embodiments, the initialization agent invokes the UNIX/LINUX ss command (i.e., "ss-i") to retrieve TCP specific statistics about established connections from the host kernel. Some of the TCP specific statistics returned by the kernel include a size or value of the congestion window, retransmission timeouts, slow-start threshold, etc. for each established connection.

In some embodiments, the initialization agent derives the congestion window for each connection based on the number and rate of acknowledgements and outgoing segments on each connection. Still other embodiments support alternative ways with which to monitor or determine connection congestion windows.

In some embodiments, the initialization agent congestion window monitoring and tracking is periodic or continual. In some embodiments, the monitoring and tracking interval for each connection is independently configurable. For example, the initialization agent can monitor and track the congestion windows of all established connections every second. As another example, the initialization agent can monitor and track the congestion window of a given connection every second that connection remains established and active as a result of data being exchanged between the two endpoints of the connection. Still other embodiments monitor and track the congestion window during certain triggering events, such as when usage of the host processor falls below a specified threshold or when a certain number of passed segments have been successfully acknowledged by the receiving client.

In some embodiments, the monitoring agent maintains a buffer or database to store the tracked congestion window values for each monitored connection. The buffer or database can itself be stored on memory of a corresponding host.

Any single congestion window value tracked throughout the monitoring duration of a connection can be used to dynamically initialize the congestion window for a subsequent instance of that connection or a related connection. For example, the last congestion window observed while monitoring a given connection can be used to dynamically initialize the congestion window when that connection is next established with the same or related client endpoint.

Typically however, the initialization agent tracks for each particular connection, a single congestion window value that is derived from one or more of the congestion window values that were observed while monitoring that particular connection. The single value derived by the initialization agent can be any of the mode, median, or maximum of the congestion values tracked by the initialization agent between establishment and termination of a connection. In some embodiments, the single derived congestion window value is the average of the congestion window values that the initialization agent tracks for that connection. The tracked average can be a standard average, moving average, or weighted average in some embodiments. The tracked average can therefore be indicative of the average amount of congestion experienced by the prior instance of the connection.

In some embodiments, any congestion window value obtained or derived from monitoring of a connection can be produced prior to that connection being terminated. In other words, a connection need not be terminated or closed prior to the initialization agent generating one or more congestion window values that can be used to dynamically initialize a subsequent instance of that connection with the same or similar client endpoint. It should be noted that the derived or obtained congestion window values will usually be greater than the predefined default TCP starting congestion window value, though a heavily congested connection that is continually subjected to TCP congestion avoidance procedures may result in a derived or obtained congestion window that is equal to the default TCP starting congestion window value.

FIG. 1 conceptually illustrates congestion window monitoring and tracking as performed by the initialization agent in accordance with some embodiments. The figure illustrates a timeline 110 presenting various congestion window values that the initialization agent 105 tracks while periodically monitoring an established connection over which a host 120 transmits data to a client 130. The figure further illustrates a table 115 storing single congestion window values that were derived from the congestion window values tracked while monitoring the connection.

The timeline 110 is divided into different intervals. Each interval identifies when the initialization agent 105 inspects the connection's congestion window and monitors a congestion window value. From the monitored congestion window values, the initialization agent 105 derives the congestion window values that are used to dynamically initialize the congestion window for a subsequent instance of the connection with the same or similar client endpoint.

The derived values are stored to table 115. As shown, the derived congestion window values include any of the last value 140, standard average 150, moving average 160, and weighted average 170 for the congestion window of the monitored connection. These are examples of just some of the possible congestion window values that the initialization agent 105 can track for a connection. Typically, the table 115 will store one such derived value for each monitored connection. It should be apparent that the initialization agent 105 can use other mathematical algorithms or distributions in order to derive a congestion window value for a prior instance of a recurring connection.

Table 115 is representative of an initialization table that the initialization agent maintains for each host whose connections the initialization agent monitors and tracks. The initialization table is stored to memory of the initialization agent or host that the initialization agent runs in conjunction with. The initialization table for a particular host stores the derived congestion window values as well as or instead of any tracked congestion window values that the initialization agents obtains from monitoring connections that were previously established with that particular host.

Figure 2:
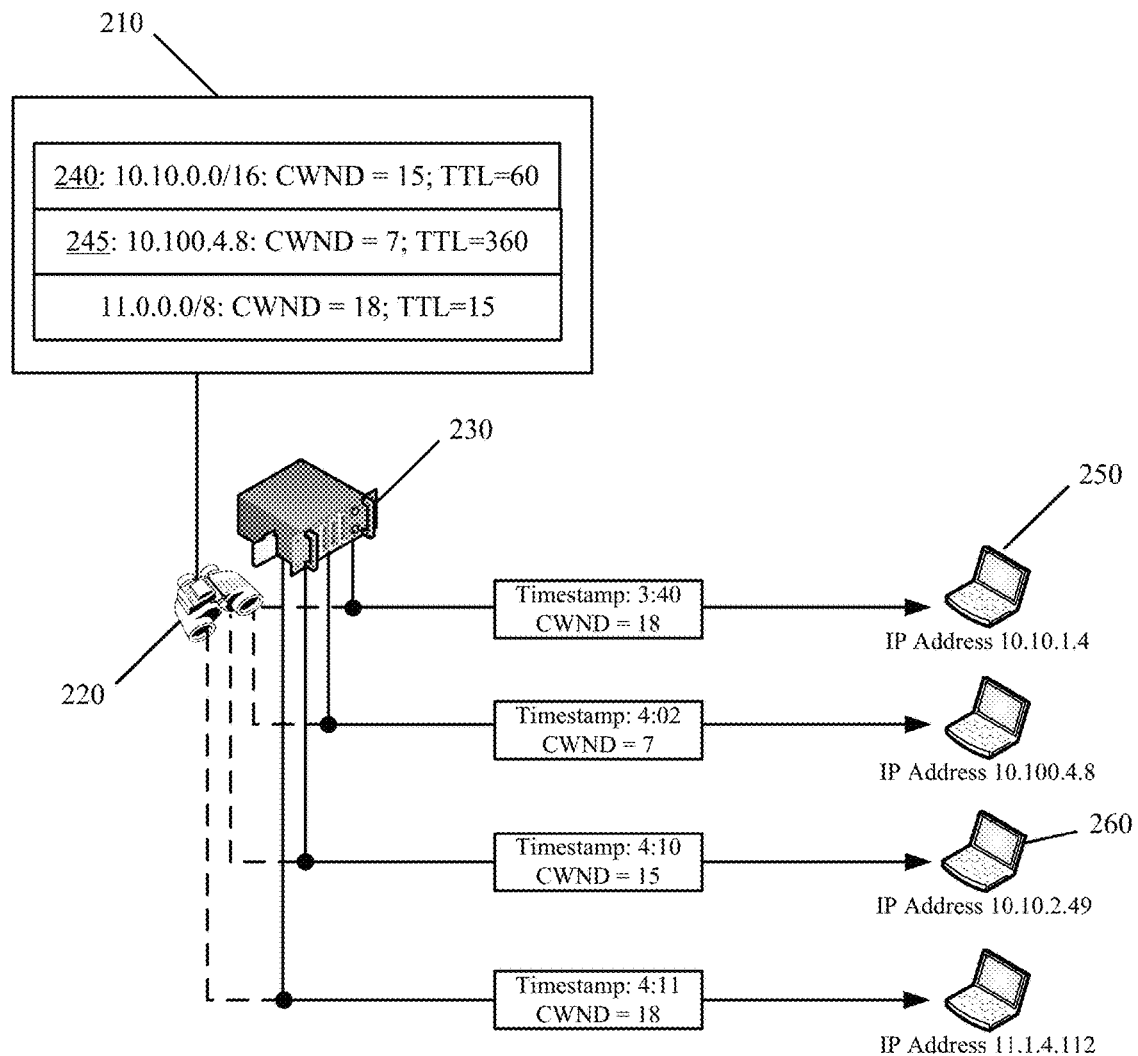
FIG. 2 conceptually illustrates an initialization table that an initialization agent generates and stores for different connections that were established with a particular host in accordance with some embodiments.

FIG. 2 conceptually illustrates an initialization table 210 that an initialization agent 220 generates and stores for different connections that were established with a particular host 230 in accordance with some embodiments. The initialization table 210 stores an address for one or more clients that act as an endpoint for a previously established connection. For each client address, the initialization table 210 also stores a congestion window value and an optional time-to-live (TTL) parameter.

The congestion window value stored in connection with a client address can be a value obtained from monitoring a previous connection that is established with a client identified by the client address. Alternatively, the congestion window value stored in connection with a client address can be a value that is derived from the monitoring the congestion window of the previous connection established with the client over time.

As the congestion experienced by a connection can change over time, the TTL parameter for a stored congestion window value ensures that the congestion measurement indicated by that TTL parameter is accurate in terms of time. A TTL parameter setting a value of one minute allows the congestion window value associated with the same table 210 entry to be valid for one minute after it was taken or derived. In other words, if the connection is not reestablished with the same or similar client endpoint as the original monitored connection within the time set by the TTL parameter, the stored congestion window value in the table 210 that is associated with that TTL parameter will not be used to initialize the new connection. In such cases, the initialization agent 220 will initialize the connection with the preconfigured default starting value used as part of the standard TCP protocol. If however, a connection is reestablished prior to the expiration of the time that is set by the TTL parameter for that connection, the stored congestion window value for that connection is used to initialize the congestion window of the new connection. Moreover, the initialization agent 220 will reset or update the TTL for that connection based on one or more congestion window values that are tracked or derived from monitoring the new connection. When the TTL parameter for an entry in the initialization table 210 expires, the initialization agent 220 may remove that entry from the table 210.

The address that is associated with a table 210 entry can be the exact IP address of the client that established the connection with the host (e.g., entry 245), an address prefix/subnet that is derived from the addressing of one or more clients that established a connection with the host (e.g., entry 240), or an address for a gateway that is used in reaching a client with a prior connection established with the host.

As shown in the initialization table 210, the initialization agent 220 may create an address prefix/subnet entry 240 by bunching together the addressing of clients 250 and 260 that are within the same address prefix or subnet. In some embodiments, the congestion window value listed with a bunched address prefix or subnet includes the last congestion window value from the most recent connection established with any client in the bunch or a value that is derived from the individual congestion window values from the last connection established with each client in the bunch. A derived value can include, for example, an average of the congestion window values observed for the most recent connection that the host established with a client in the bunch. As another example, the derived value can include the average of the average congestion window values observed for the most recent connection that the host established with each client in the bunch. The bunching of client addressing and the resulting sharing of a tracked congestion window value amongst connections established by the clients of the bunch is based on the realization that the network hops that clients of a given address prefix or subnet traverse is mostly the same. As a result, those clients will likely experience the same or similar network congestion when connecting to the same host. Bunching also has the added benefit of ensuring real-time relevancy of the shared congestion window value when the value is based on the congestion window observed from a most recently established connection with a client in the bunch. For example, the initialization agent may use a shared congestion window value to dynamically initialize the connections of five distinct but related clients. A particular client of the five related clients may only rarely connect with the host. Rather than rely on an outdated congestion window value tracked for a last connection made by that particular client, the initialization agent can use a congestion window size from a more recently tracked connection of another one of the five clients to initialize the congestion window size for a new connection with the particular client.

Using the initialization table, the initialization agent can identify when a connection is reestablished. Specifically, the initialization agent compares the address of the client establishing the new connection with the addressing that is stored to the initialization table. If a match is found, then the initialization agent can identify the new connection as a recurring connection. In such cases, the initialization agent retrieves the previous congestion window value that is associated with a prior established connection with the same or similar client from the table. The initialization agent then uses the retrieved value to initialize the congestion window of the new connection dynamically (provided that the TTL parameter has not expired), thereby avoiding the TCP slow-start phase.

As noted above, an address match occurs when the address of a client establishing the new connection directly or indirectly matches with an address in the initialization table. A direct match occurs when the address of the client establishing the new connection matches exactly with the address that is associated with a tracked congestion window value entry of the initialization table. An indirect match occurs when one of the address, address prefix, address subnet, or gateway address of the client establishing the new connection matches with one of the address, address prefix, address subnet, or gateway address of a tracked congestion window value entry of the initialization table.

Figure 3:
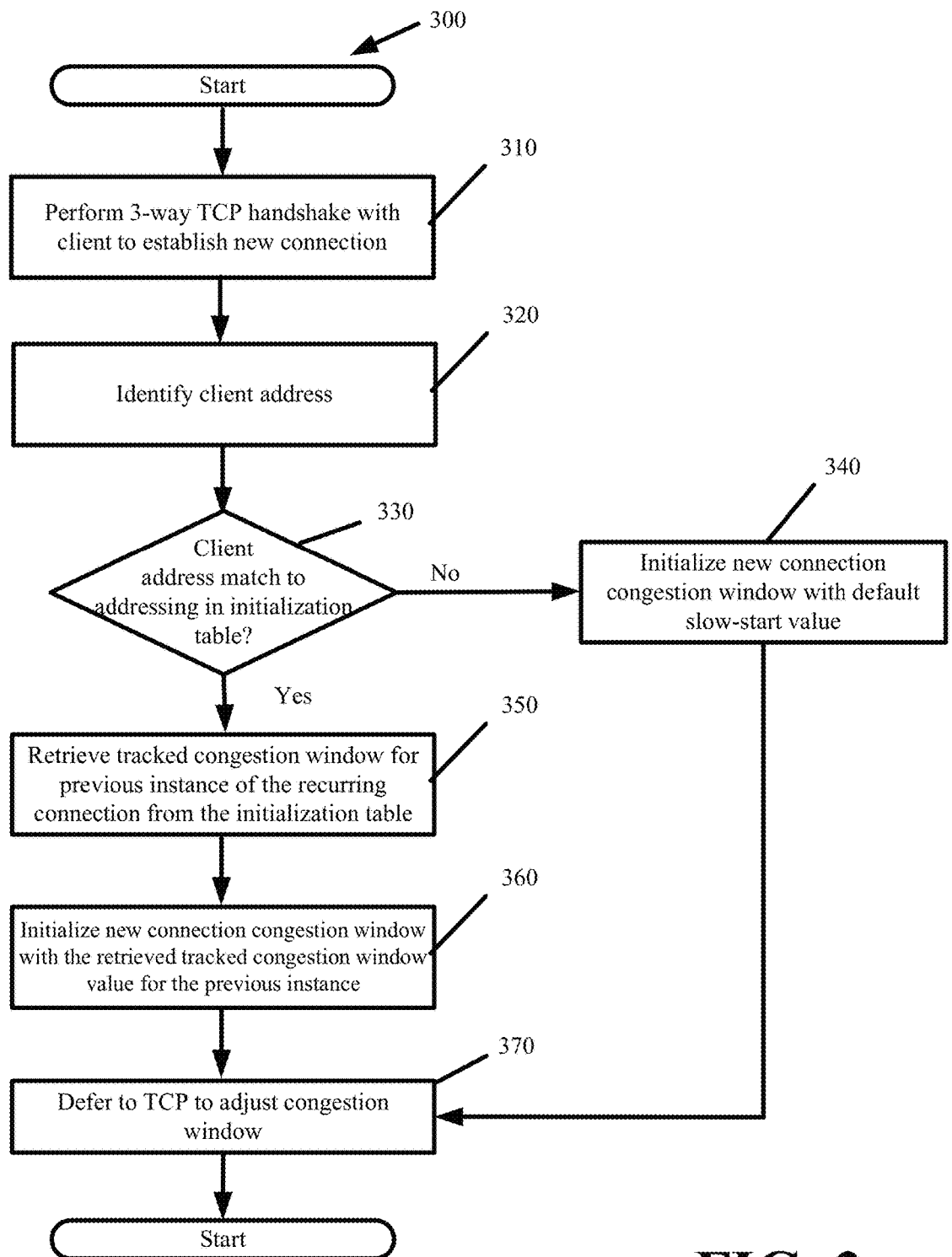
FIG. 3 presents a process performed by the initialization agent in accordance with some embodiments to dynamically initialize the congestion window of a connection based on a congestion window value that is obtained or derived from a previous instance of that connection with the same or similar client.

When a new client connection is determined to be a recurring connection as a result of an identified match, the initialization agent dynamically initializes the congestion window of the new client connection using the congestion window value from the initialization table entry with the matching address. FIG. 3 presents a process 300 performed by the initialization agent in accordance with some embodiments to dynamically initialize the congestion window of a connection based on a congestion window value that is obtained or derived from a previous instance of that connection with the same or similar client.

The process 300 commences when performing (at 310) the three-way TCP handshake to establish a connection with a client. As part of the three-way handshake, the host and client exchange SYN, SYN-ACK, and ACK messages. Within the message headers are various parameters for coordinating data transfer between the host and client as well as initializing flow and congestion controls for the connection. Some such parameters include the sequence number, the acknowledgement number, and the client window size. From the message headers, the process also identifies (at 320) an address for the client establishing the connection.

Using the client address, the process determines whether the connection being established is a recurring connection. Specifically, the process compares (at 330) the client address with addressing that is stored to the initialization table. A match is made when the client address matches an address within the host table, whether as a result of a direct match or indirect match. As noted above, an indirect match can result when the prefix of the client address matches an address that is stored to the table, when the client address matches a prefix address that is stored to the table, or when the gateway address used by the client matches a gateway address that is stored to the table.

If a match for a recurring connection cannot be made, the process reverts to standard TCP slow-start. Accordingly, the congestion window for the new connection is initialized (at 340) with a preconfigured default starting value.

If a match is made, then the process identifies the connection as a recurring connection. For any match identifying a recurring connection, the process retrieves (at 350) from the initialization table, the congestion window value that is obtained or derived from a prior instance of that connection. The process then dynamically initializes (at 360) the new connection congestion window with the congestion window value from the matching entry of the initialization table. In this scenario, the process circumvents the TCP slow-start phase by initializing the new connection congestion window with a value that is greater than the default starting value preconfigured for TCP slow-start.

Once the connection is established and the congestion window of the connection is initialized with a starting value, the process defers (at 370) to the TCP protocol to make subsequent adjustments to the connection congestion window. Specifically, the congestion control and congestion avoidance TCP procedures adjust the connection congestion window according to client acknowledgements of segments submitted from the host, wherein the rate and proportion of received acknowledgements relative to submitted segments that remain unacknowledged or outstanding are used by the host to determine the underlying network congestion. In some embodiments, the process can begin growing the congestion window with an exponential growth phase or more conservative linear growth phase if the connection is unaffected by congestion. As the standard TCP congestion control and congestion avoidance procedures are well documented, their discussion will be omitted for simplicity.

Some embodiments dynamically initialize the congestion window without modifying the protocol stack of the host. A benefit of such an implementation is the preservation of standard TCP protocol operation for all aspects other than congestion window initialization. Consequently, the host can continue standard TCP connection establishment, congestion avoidance, and other procedures to facilitate the dialog between the host and client once the connection is established and can operate according to the standard TCP protocol when a congestion window value is not available within the initialization table for dynamic congestion window initialization of a new connection. In other words, interoperability of a host performing dynamic congestion window initialization is not compromised. Such a host can operate in any existing network environment and with existing network resources operating according to standard network protocols.

Some embodiments initialize the congestion window of a new connection by way of route configuration. For each new connection, the initialization agent creates a new route in the host's routing table. The "ip route" function allows for the configuration of the routing table on hosts running the UNIX or LINUX operating systems. To create a new route and dynamically initialize the congestion window for connections to clients that are reachable through the route, the initialization agent issues the command "ip route add <client address> via <gateway address> initcwnd X initrwnd Y". This command creates a new route in the host routing table that identifies that any data exchanges between the host and the specified <client address> should be passed through the <gateway address> with the congestion window initially set to the value X and with Y setting the upper bound for the host congestion window size (i.e., host receive window). Accordingly, when the host attempts to pass a segment to a client over an established connection, the host queries the routing table to identify the next hop or route of the connection and uses the congestion window value that is configured for that route when passing an initial set of segments to the client. Similar commands can be used for hosts running the Windows or MacOS operating systems. Some embodiments set the upper bound for the host congestion window size using the "initrwnd Y" or similar command when the recurring connection is high bandwidth or the connection endpoints are controlled by a common entity. Connections between Points-of-Presence (PoP) of a content delivery network are examples of some such recurring connection. The "initrwnd Y" command parameter can therefore be optionally set depending on the usage scenario.

In some embodiments, the initialization agent manages the routing table by removing any routes that are created for a particular client when a connection with that particular client is closed. In some embodiments, the routes are automatically purged from the routing table. In some such embodiments, each route is created with a configurable expiration parameter that specifies the duration that the route is to remain within the routing table.

In some embodiments, initializing the congestion window of a new connection by way of route configuration also involves ensuring that the host kernel's send and receive buffers are sufficiently large to handle the larger data load resulting from the dynamically initialized congestion window being greater than the default TCP starting congestion window. To modify the kernel send and receive buffers, the initialization agent uses the "sysctl" command. Specifically, the "sysctl-w net.core.rmem_max=X" command can be used to set the kernel receive buffer size to the value X and the "sysctl-w net.core.rmem_max=Y" command can be used to set the kernel send buffer size to the value Y.

Figure 4:
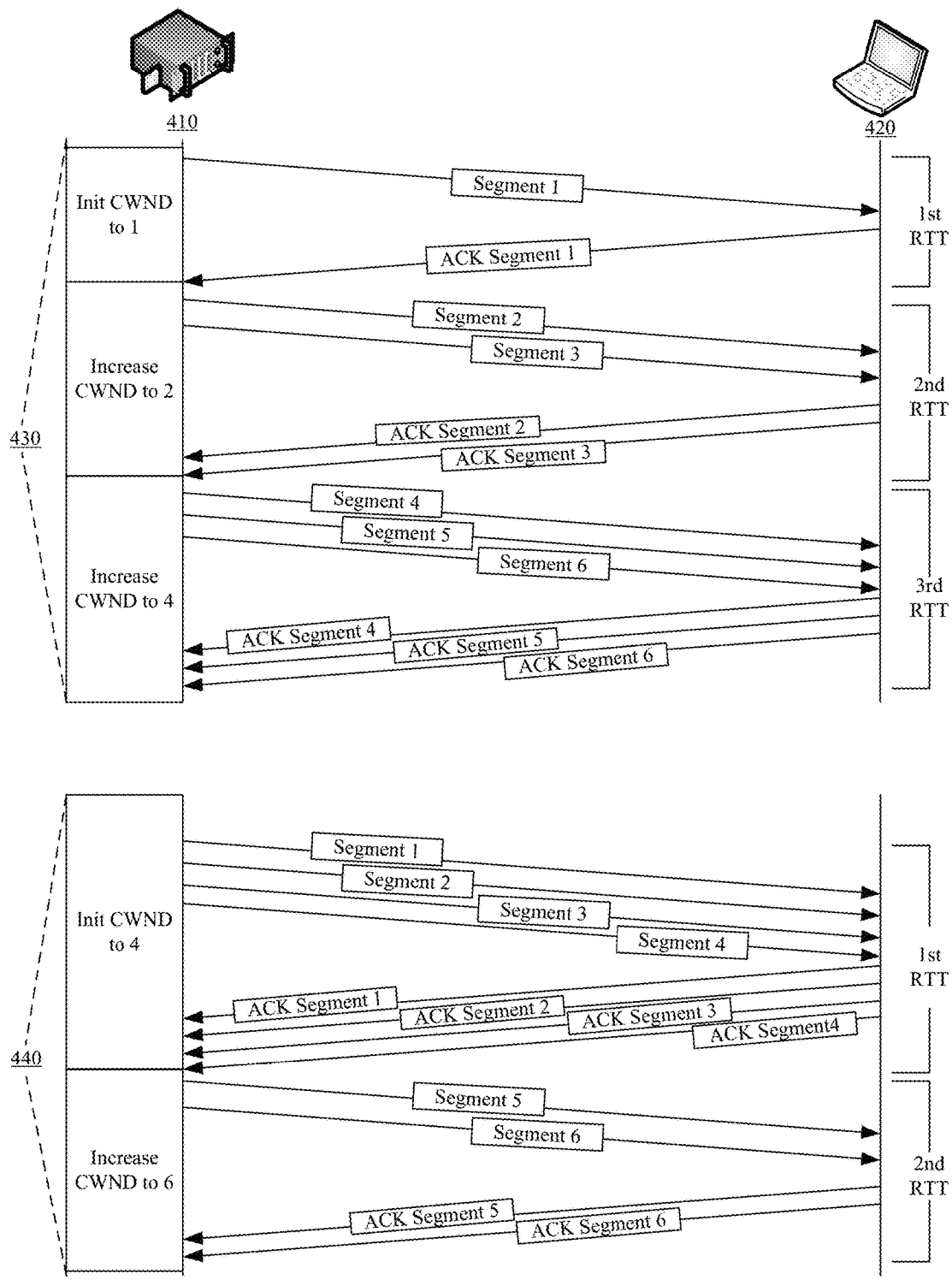
FIG. 4 conceptually illustrates how dynamically initializing the congestion window with a value obtained from the congestion window of a previous instance of that connection in accordance with some embodiments provides increased throughput relative to initializing the congestion window according to standard TCP slow start.

FIG. 4 conceptually illustrates how dynamically initializing the congestion window with a value obtained from the congestion window of a previous instance of that connection in accordance with some embodiments provides increased throughput relative to initializing the congestion window according to standard TCP slow start. FIG. 4 illustrates the total round-trip time (RTT) for the same exchange occurring over a connection established between a host 410 and a client 420 (1) when initializing the connection congestion window according to TCP slow-start (i.e., exchange 430) and (2) when initializing the connection congestion window with a dynamic value obtained from a previous established instance of that connection (i.e., exchange 440). In each exchange, the host 410 attempts to send to the client 420 a total of 9,000 bytes using segments with a maximum segment size (MSS) of 1,500 bytes. In total, the host 410 sends six segments to the client 420.

In the TCP slow-start initialized exchange 430, the connection is initialized with a default slow-start congestion window of one. The default value of one is chosen in this figure to simplify the discussion, even though the actual TCP slow-start congestion window currently defaults to ten. The default congestion window of one allows the host 410 to send one outstanding segment to the client 420. The host 410 then waits for the client's 420 acknowledgement of the first segment before submitting any further segments. If the client's 420 acknowledgement is not received prior to expiration of a retransmit timer running on the host 410 or the segment is otherwise lost, the host 410 will perform the standard TCP congestion avoidance procedure to shrink the congestion window size. More specifically, the host 410 will scale back the number of outstanding segments it sends in the next transmission or will reset the congestion window back to the default starting size. This is only an issue when the congestion window has grown beyond the default congestion window starting value.

In the exchange 430, the client 420 acknowledgement of the first segment is received in the specified time. The timely acknowledgement allows the host 410 to increase the number of outstanding unacknowledged segments it sends over the connection. Accordingly, the host 410 doubles the connection congestion window size during an exponential growth phase of TCP slow-start. Consequently, the host 410 next submits the second and third segments to the client 420. The number of outstanding unacknowledged segments permitted by the newly increased congestion window is again reached, so the host 410 awaits acknowledgements of the second and third segments before sending any additional segments. The host 410 receives the acknowledgements within the retransmit timer interval, again doubles the connection congestion window to four, and sends the fourth, fifth, and sixth segments to the client 420. As seen, this first exchange 430 requires three RTTs. If each RTT takes a total of 200 milliseconds, then the entire exchange 430 according to TCP slow-start takes 600 milliseconds.

In the dynamic congestion window initialized exchange 440, the connection is initialized with a congestion window of four based on a last congestion window size value obtained from a prior instance of the connection (see exchange 430). Accordingly, the host 410 begins the exchange by transmitting the first, second, third, and fourth segments to the client 420. The client 420 provides the acknowledgements before expiration of the host 410 retransmit timer. The host 410 then increases its congestion window size. If scaling according to the exponential growth phase of TCP slow-start, the congestion window size would increase to eight. However, because the dynamically configured is close to a final value, the host 410 may scale the congestion window size more conservatively. In this example, the congestion window size is scaled to a value of six. Regardless, the host 410 next sends the final two segments to the client 420. Upon acknowledgement of the final two segments, the dynamic congestion window initialized exchange 440 is completed in only two RTTs resulting in a total transmission time of 400 milliseconds which is 33% faster than the TCP slow-start exchange 430.

Thusfar, the description has centered around an initialization agent that maintains an initialization table for use in dynamically initializing the congestion window for connections established between a host and various clients. However, in some embodiments, the same initialization table and its obtained or derived congestion window values can be shared between multiple hosts that are geographically proximate to one another or are collocated in a server farm or PoP. In such cases, each host within a particular PoP may be monitored by a different initialization agent instance. The different initialization agent instances then enter any obtained or derived congestion window values to the same shared particular PoP initialization table. In some other embodiments, a single initialization agent instance is used to monitor the connections established by all hosts of the particular PoP with the monitoring results, obtained congestion window values, or derived congestion window values being recorded to one initialization table. In either case, the initialization table is used to determine if a new connection being established with any particular PoP host is recurring based on previous connections established by any PoP host to the same or similar client endpoint. If the new connection is recurring, then the congestion window value obtained or derived from the last instance of that the connection can be used to dynamically initialize the congestion window of the new connection irrespective of which PoP host established the last instance of the connection and which PoP host is establishing the new connection.

A benefit of the shared initialization table is that a first connection made by a first host to a first client in a particular service region can be initialized with a congestion value that is tracked from a second connection made by a second host to a second client in the same particular service region. In other words, the congestion window value for a first connection between a PoP and a service region can be used to initialize the congestion window of a second connection between the PoP and the same service region irrespective of the hosts and clients that serve as the connection endpoints.

Figure 5:
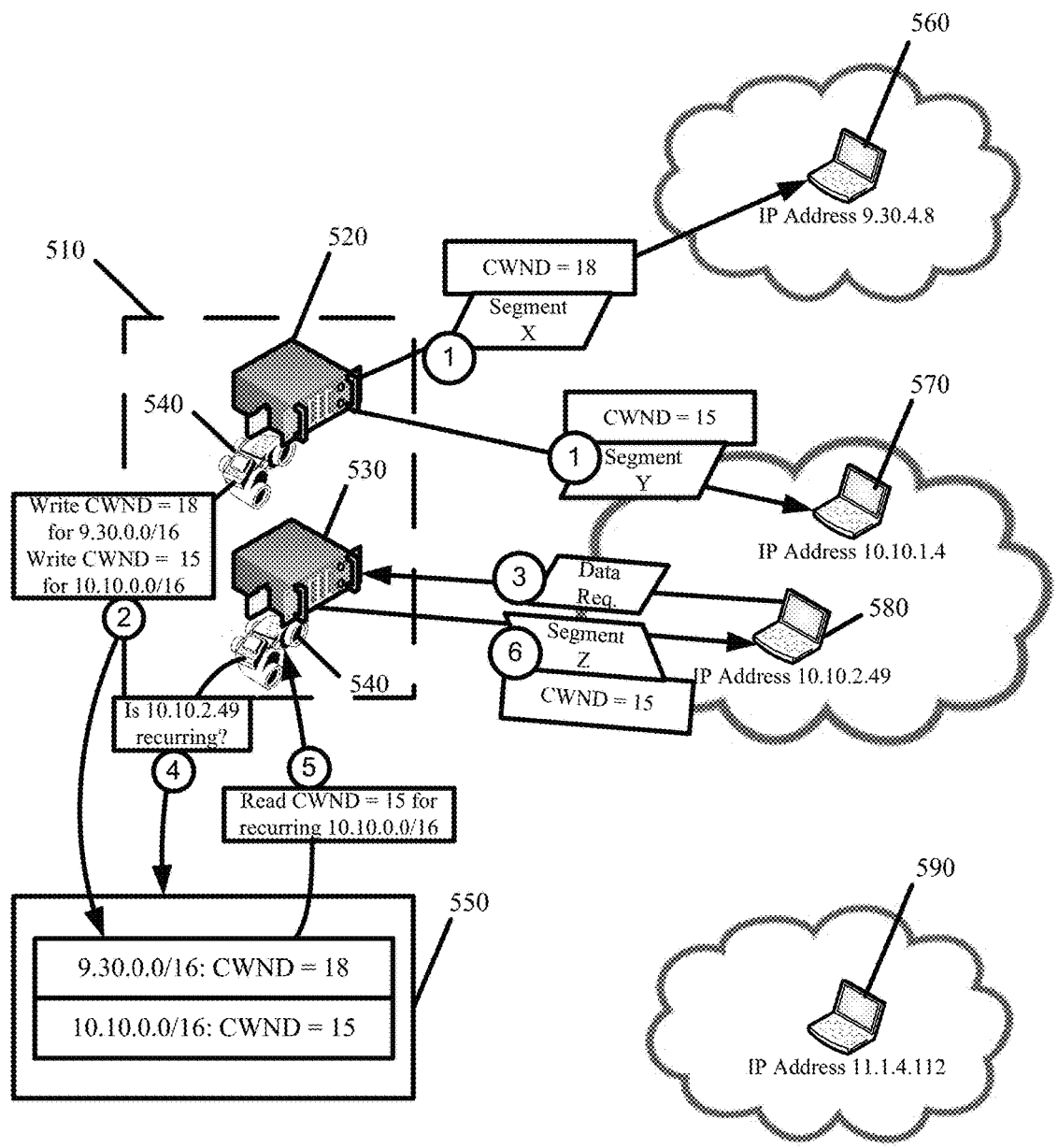
FIG. 5 illustrates shared use of an initialization table in accordance with some embodiments.

FIG. 5 illustrates shared use of an initialization table in accordance with some embodiments. The figure illustrates a PoP 510 comprised of at least two host servers 520 and 530 and an initialization agent 540.

The PoP servers 520 and 530 are tasked with serving content to three different service regions. Each service region may have one or more clients (e.g., clients 560, 570, 580, and 590) operating therein with the clients of each service region being assigned addressing to a different address subnet.

The PoP initialization agent 540 monitors and tracks the congestion window of any connections established by the servers 520 and 530. Any obtained or derived congestion window values resulting from the monitoring are stored to initialization table 550. Also, the initialization agent 540, in operation with the servers 520 and 530, leverages congestion window values of prior connections that are tracked to the initialization table 550 in order to dynamically initialize the congestion window of a recurring connection that is newly established by either server 520 or 530.

PoP server 520 is shown with a first established connection to a first client 560 in a first service region and a second established connection to a second client 570 in a second service region. The initialization agent 540 monitors the congestion window of each connection to the first client 560 and the second client 570. The initialization agent 540 records a congestion window value for each connection in the initialization table 550.

Subsequently, a third client 580 operating in the second service region submits a connection establishment and data request to PoP server 530. The initialization agent 540 checks the initialization table 550 to determine if the connection with the third client 580 is a recurring connection. The initialization table 550 identifies the third connection as a recurring connection since the third client 580 is from the same subnet as the second client 570. Accordingly, the initialization agent 540 initializes the congestion window for the third connection between PoP server 530 and the third client 580 using the congestion window value from the connection that was previously established between the PoP server 520 and the second client 570. In so doing, the connection between the PoP server 530 and a first client with an address in a particular subnet/address prefix is initialized using a congestion window value obtained or derived from a prior connection between the PoP server 520 and a different second client with an address in the particular subnet/address prefix.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, desktop computers. Examples of computer-readable media include, but are not limited to, CD-ROMs, flash drives, RAM chips, hard drives, EPROMs, etc.

FIG. 6 illustrates a computer system or server with which some embodiments are implemented. Such a computer system includes various types of computer-readable mediums and interfaces for various other types of computer-readable mediums that implement the various methods and machines described above (e.g., hosts, initialization agents, etc.). Computer system 600 includes a bus 605, a processor 610, a system memory 615, a read-only memory 620, a permanent storage device 625, input devices 630, and output devices 635.

The bus 605 collectively represents all system, peripheral, and chipset buses that communicatively connect the numerous internal devices of the computer system 600. For instance, the bus 605 communicatively connects the processor 610 with the read-only memory 620, the system memory 615, and the permanent storage device 625. From these various memory units, the processor 610 retrieves instructions to execute and data to process in order to execute the processes of the embodiments described above. The processor 610 is a processing device such as a central processing unit, integrated circuit, graphical processing unit, etc.

The read-only-memory (ROM) 620 stores static data and instructions that are needed by the processor 610 and other modules of the computer system. The permanent storage device 625, on the other hand, is a read-and-write memory device. This device is a non-volatile memory unit that stores instructions and data even when the computer system 600 is off. Some embodiments use a mass-storage device (such as a magnetic, solid-state disk, or optical disk and its corresponding disk drive) as the permanent storage device 625.

Other embodiments use a removable storage device (such as a flash drive or solid-state disk) as the permanent storage device. Like the permanent storage device 625, the system memory 615 is a read-and-write memory device. However, unlike storage device 625, the system memory is a volatile read-and-write memory, such as random access memory (RAM). The system memory stores some of the instructions and data that the processor needs at runtime. In some embodiments, the processes are stored in the system memory 615, the permanent storage device 625, and/or the read-only memory 620.

The bus 605 also connects to the input and output devices 630 and 635. The input devices enable the user to communicate information and select commands to the computer system. The input devices 630 include alphanumeric keypads (including physical keyboards and touchscreen keyboards), pointing devices (also called "cursor control devices"). The input devices 630 also include audio input devices (e.g., microphones, MIDI musical instruments, etc.). The output devices 635 display images generated by the computer system. The output devices include printers and display devices, such as liquid crystal displays (LCD).

Finally, as shown in FIG. 6, bus 605 also couples computer 600 to a network 665 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 600 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. A method comprising:
storing in memory of a particular server, a first congestion window value used in transmitting data packets over a first network connection to a first client device, wherein the first congestion window value is larger than a default initial congestion value used to initialize said first network connection;
establishing a different second network connection between the particular server and a second client, wherein said establishing comprises (i) initializing a congestion window of the second network connection with the first congestion window value from the first network connection in response to commonality in addressing between the first client and the second client, and (ii) initializing the congestion window of the second network connection with the default initial congestion window value in response to no commonality in the addressing between the first client and the second client;
regulating, with the first congestion window value, transmission of an initial set of data packets from the particular server to the second client over the second network connection in response to said commonality in addressing between the first client and the second client; and
regulating, with the default initial congestion value, transmission of said initial set of data packets from the particular server to the second client over the second network connection in response to no commonality in addressing between the first client and the second client.

2. The method of claim 1, wherein said initializing the congestion window of the second network connection with the first congestion window value comprises changing the default initial congestion value of the second network connection to the first congestion window value before transmission of a first data packet over the second network connection.

3. The method of claim 1, wherein said commonality in addressing between the first client and the second client comprises at least one of an address of the second client being the same as an address of the first client, or the address of the second client being in a specific subnet or range as the address of the first client.

4. The method of claim 1 further comprising terminating the first network connection with the first client prior to said establishing the different second network connection with the second client.

5. The method of claim 1 further comprising transmitting a plurality of data packets from the particular server to the first client over the first network connection, and tracking different congestion window values of the first network connection at different points in time during said transmitting.

6. The method of claim 5, wherein storing the first connection congestion window value comprises computing said first congestion window value from the different congestion window values resulting from said tracking.

7. The method of claim 1, wherein the default initial congestion value is the Transmission Control Protocol (TCP) default starting congestion window value.

8. A method comprising:
storing in memory of a particular server, a first congestion window value used in transmitting data packets over a first network connection to a first client device, wherein the first congestion window value is larger than a default initial congestion value used to initialize network connections according to a network protocol;
transmitting based on the first congestion window value, an initial first set of unacknowledged data packets from the particular server to a second client over a different second network connection in response to commonality in addressing between the first client and the second client, wherein the initial first set of unacknowledged data packets are transmitted from the particular server prior to the second client acknowledging any data packet in the initial first set of unacknowledged packets; and
transmitting based on the default initial congestion window value, an initial second set of unacknowledged data packets from the particular server to the second client over the second network connection in response to no commonality in addressing between the first client and the second client, wherein the initial first set of data packets transmitted based on the first congestion window value has more unacknowledged data packets than the initial second set of data packets transmitted based on the default initial congestion window value, and wherein the initial second set of unacknowledged data packets are transmitted from the particular server prior to the second client acknowledging any data packet in the initial second set of unacknowledged packets.

9. The method of claim 8 further comprising establishing the different second network connection with the second client prior to sending any data packets over the second network connection, wherein said establishing comprises overriding a congestion window value set by the Transmission Control Protocol (TCP) in response to commonality in the addressing between the first client and the second client, and retaining the congestion window value set by the TCP in response to no commonality in the addressing between the first client and the second client.

10. The method of claim 8, wherein storing the first congestion window value comprises storing a time-to-live (TTL) parameter with said first connection congestion window value.

11. The method of claim 10 further comprising establishing the different second network connection with the second client prior to sending any data packets over the second network connection, wherein said establishing comprises initializing the congestion window of the second network connection with the first connection congestion window value of the first connection in response to said commonality and the TTL parameter not expiring, and initializing the congestion window of the second connection with the default initial congestion window value in response to said commonality and the TTL parameter expiring.

12. A method comprising:
establishing a first network connection prior to passing a first data packet over said first network connection, wherein said establishing the first network comprises initializing a congestion window of the first network connection with a first congestion window value from a different second network connection;

initiating transmission of data packets over the first network connection by sending a first number of unacknowledged data packets based on said first congestion window value;

establishing a third network connection prior to passing a first data packet over said third network connection, wherein said establishing the third network connection comprises initializing a congestion window of the third network connection with a different second congestion window value from a different fourth network connection; and initiating transmission of data packets over the third network connection by sending a different second number of unacknowledged data packets based on said second congestion window value, wherein the second number of unacknowledged data packets is greater than the first number of unacknowledged data packets.

13. The method of claim 12, wherein the first congestion window value and the second congestion window value are different than a default starting Transmission Control Protocol (TCP) congestion window value.

14. The method of claim 12, wherein the first number of unacknowledged data packets and the second number of unacknowledged data packets are greater than a starting number of unacknowledged data packets defined by TCP.

15. The method of claim 12, wherein the second network connection is terminated prior to said establishing the first network connection, and wherein the fourth network connection is terminated prior to said establishing the third network connection.

16. The method of claim 12 further comprising identifying commonality in addressing between endpoints of the first and second network connections during said establishing the first network connection, and identifying commonality in addressing between endpoints of the third and fourth network connections during said establishing the third network connection.

17. The method of claim 12 further comprising adjusting the first congestion window value while passing a plurality of data packets over the second network connection.

18. A device comprising:
a non-transitory computer-readable medium storing a set of processor-executable instructions; and
one or more processors configured to execute the set of processor-executable instructions, wherein executing the set of processor-executable instructions causes the one or more processors to:
store in the non-transitory computer-readable medium, a first congestion window value used in transmitting data packets over a first network connection to a first client device, wherein the first congestion window value is larger than a default initial congestion value used to initialize network connections according to Transmission Control Protocol (TCP);
establish a different second network connection with a second client prior to sending any data packets over the second network connection, wherein said establishing comprises processor-executable instructions to:
override a congestion window value set by the TCP in response to commonality in the addressing between the first client and the second client, and
retain the congestion window value set by the TCP in response to no commonality in the addressing between the first client and the second client;
transmit based on the first congestion window value, an initial first set of unacknowledged data packets to the second client over a different second network connection in response to commonality in addressing between the first client and the second client; and
transmit based on the default initial congestion window value, an initial second set of unacknowledged data packets to the second client over the second network connection in response to no commonality in addressing between the first client and the second client, wherein the initial first set of data packets transmitted based on the first congestion window value has more unacknowledged data packets than the initial second set of data packets transmitted based on the default initial congestion window value.

* * * * *